H. L. NARAMORE.
Sled-Brake.
No. 57,951.  Patented Sept 11, 1866.
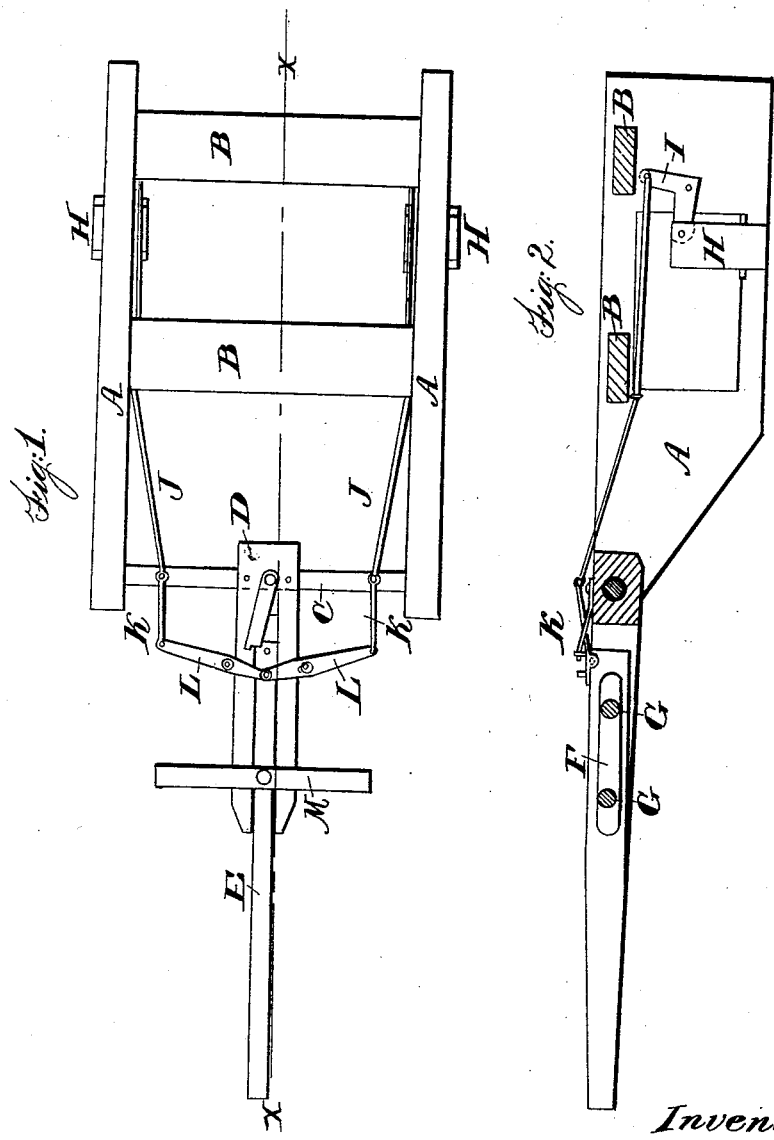
Witnesses
Jas. A. Service
Wm Trewrn
Inventor
H. L. Naramore
Per Munn & Co
Attorneys

UNITED STATES PATENT OFFICE.

H. L. NARAMORE, OF CUMMINGTON, MASSACHUSETTS.

IMPROVEMENT IN SLED-BRAKES.

Specification forming part of Letters Patent No. 57,951, dated September 11, 1866.

*To all whom it may concern:*

Be it known that I, H. L. NARAMORE, of Cummington, in the county of Hampshire and State of Massachusetts, have invented a new and Improved Brake for Sleds; and I do hereby declare that the following is a full, clear, and exact description thereof, reference being had to the accompanying drawings, forming part of this specification.

The nature of my invention consists in the employment of two pivoted levers, one end of each being connected to the pole at its rear end, and the other ends connected by rods to elbow-levers that connect with the brake.

Brakes of various kinds are often applied to wheeled vehicles, especially in hilly sections, for the purpose of relieving the team from the pressure of the load; but brakes being applied to sleds has been neglected, except throwing a chain around the forward end of the runner, which brings the friction all upon one side, so that it racks the sled and has a tendency to throw the team off from the road by the lateral motion of the pole.

By my invention I am able to obviate all this difficulty and danger, to which the team and driver, as well as sleds, are subjected to in going down a slippery hill with a load upon sleds, by an automatical arrangement, so that an almost dead brake is applied, and relieves the team from the pressure and danger to which they would otherwise be exposed.

To enable others skilled in the art to make and use my invention, I will proceed to describe its construction and operation.

Figure 1 is a top-plan view of my improved brake. Fig. 2 is a longitudinal vertical sectional elevation of the same from the line X X.

Letters of like name and kind refer to like parts in each of the figures.

A represents the runners, to which my improved brake is applied, of common construction.

B B are the beams that connect and hold the runners in their position. C is the roll that passes from one runner to the other, and through holes in which it turns in the forward end of the said runners. To this roll is attached the block or hounds D, in which is connected the pole or tongue E by means of a slot, F, in the rear end of which are bolts G G, upon which the pole slides back and forth.

H H are the brake-bars, that stride the runners in a transverse direction and stand in a vertical position.

I I are elbow-levers, secured at the elbow to the inside by a pivot-bolt. One end of the said levers is attached to the brake-bar H, and the other connected by rods J J to links K K, that connect to one end of pivotal levers L L. The other ends of the said levers are connected to the rear end of the pole E by a pivot-bolt.

M is the evener, to which the whiffletrees are attached, and by which the sled is drawn.

This brake is so constructed that it is automatic in its operation. When the sled descends a slippery hill with a load, and the sled begins to press upon the team, the pole slides back, which brings immediate action upon the levers L L, which draw forward the top arm of the elbow-levers I I, which press the brakes H H hard upon the ground, the friction of which greatly relieves the team from pressure, and insuring the team, driver, and sled from danger, to which they would be otherwise exposed.

Having thus described my invention, what I claim as new, and desire to secure by Letters Patent of the United States, is—

The levers L L, rods J J, and elbow-levers I I, in combination with the brake-bars H H and sled A, substantially and for the purposes described.

The above specification of my invention signed by me this 14th day of July, 1866.

H. L. NARAMORE.

Witnesses:
ALMON MITCHELL,
NATHAN ORCUTT.